United States Patent
Abou Mahmoud et al.

(10) Patent No.: US 9,887,891 B2
(45) Date of Patent: Feb. 6, 2018

(54) GRAPH SEGMENT REPRESENTING A GIST OF AN ONLINE SOCIAL NETWORK CONVERSATION

(71) Applicant: INTERNATIONAL BUSINESS MACHINES CORPORATION, Armonk, NY (US)

(72) Inventors: Alaa Abou Mahmoud, Dracut, MA (US); Paul R. Bastide, Boxford, MA (US); Vijay Francis, Lowell, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 14/601,874

(22) Filed: Jan. 21, 2015

(65) Prior Publication Data
US 2016/0212022 A1    Jul. 21, 2016

(51) Int. Cl.
*G06F 15/173* (2006.01)
*H04L 12/26* (2006.01)
*H04L 29/08* (2006.01)
*H04L 12/58* (2006.01)

(52) U.S. Cl.
CPC ............ *H04L 43/045* (2013.01); *H04L 51/32* (2013.01); *H04L 51/34* (2013.01); *H04L 67/22* (2013.01)

(58) Field of Classification Search
CPC ....... H04L 43/045; H04L 51/32; H04L 51/34; H04L 67/22
See application file for complete search history.

(56) References Cited

U.S. PATENT DOCUMENTS

| | | | |
|---|---|---|---|
| 7,664,821 B1 | 2/2010 | Ancin et al. | |
| 8,401,009 B1 | 3/2013 | Dorsey et al. | |
| 8,682,723 B2 | 3/2014 | Parsons et al. | |
| 8,694,439 B2 | 4/2014 | Shafique | |
| 8,914,441 B2 | 12/2014 | Quintuna | |

(Continued)

OTHER PUBLICATIONS

Sanebox; "Your Email Without SaneBox," Downloaded from the Internet on Jul. 2, 2015, pp. 1-10 <http://www.sanebox.com/l/how-it-works#sthash.hEqocKRM.SmV6aodi.dpbs>.

(Continued)

*Primary Examiner* — Suraj Joshi
*Assistant Examiner* — Jaren M Means
(74) *Attorney, Agent, or Firm* — Charles L. Moore; Moore & Van Allen PLLC

(57) ABSTRACT

A method for generating a graph segment providing a gist or summary of an online social network conversation may include generating a graph of the online social network conversation. The graph of the online social network conversation may include a plurality of nodes and each node may be connected to at least one other node by an edge. Each node may represent a message of the online social network conversation and each edge may correspond to an action by a participant in the online social network conversation. The method may also include determining an edge weight for each edge and analyzing the graph of the online social network conversation using at least the edge weight of at least some edges. The method may additionally include generating a graph segment that provides a gist or summary of the online social network conversation based on the analysis.

14 Claims, 3 Drawing Sheets

(56) References Cited

U.S. PATENT DOCUMENTS

| | | | |
|---|---|---|---|
| 9,143,468 | B1 | 9/2015 | Cohen et al. |
| 9,189,567 | B1 | 11/2015 | Goldman et al. |
| 2004/0181588 | A1* | 9/2004 | Wang .............. H04L 29/06 709/207 |
| 2006/0271526 | A1* | 11/2006 | Charnock .............. G06Q 30/02 |
| 2007/0271336 | A1 | 11/2007 | Ramaswamy |
| 2011/0055335 | A1 | 3/2011 | Reilly et al. |
| 2011/0307403 | A1 | 12/2011 | Rostampour et al. |
| 2012/0136936 | A1 | 5/2012 | Quintuna |
| 2012/0143972 | A1 | 6/2012 | Malik et al. |
| 2012/0148034 | A1 | 6/2012 | Ferguson |
| 2012/0158630 | A1 | 6/2012 | Zaman et al. |
| 2012/0166532 | A1 | 6/2012 | Juan et al. |
| 2012/0290649 | A1 | 11/2012 | Ramirez et al. |
| 2013/0185245 | A1 | 7/2013 | Anderson et al. |
| 2013/0254213 | A1* | 9/2013 | Cheng .............. G06Q 50/01 707/748 |
| 2013/0325993 | A1 | 12/2013 | Rao |
| 2014/0012927 | A1* | 1/2014 | Gertzfield .............. G06Q 50/01 709/206 |
| 2014/0025692 | A1 | 1/2014 | Pappas |
| 2014/0032667 | A1 | 1/2014 | Wright |
| 2014/0082107 | A1 | 3/2014 | Gosling et al. |
| 2014/0142992 | A1 | 5/2014 | Nuzzi et al. |
| 2014/0195897 | A1 | 7/2014 | Balinsky et al. |
| 2014/0214510 | A1 | 7/2014 | Karri et al. |
| 2014/0214529 | A1 | 7/2014 | Gross-Baser et al. |
| 2014/0288985 | A1 | 9/2014 | Debow et al. |
| 2014/0316872 | A1 | 10/2014 | Lee |
| 2014/0379729 | A1 | 12/2014 | Savage et al. |
| 2015/0269155 | A1 | 9/2015 | Bastide et al. |
| 2015/0269848 | A1 | 9/2015 | Yuen et al. |
| 2015/0334072 | A1 | 11/2015 | Agarwal et al. |
| 2015/0334073 | A1 | 11/2015 | Agarwal et al. |
| 2015/0381555 | A1 | 12/2015 | Faller et al. |
| 2016/0140608 | A1 | 5/2016 | Gaudet et al. |
| 2016/0212022 | A1 | 7/2016 | Abou Mahmoud et al. |
| 2016/0212024 | A1 | 7/2016 | Abou Mahmoud et al. |
| 2016/0213994 | A1 | 7/2016 | Tilton et al. |
| 2016/0291809 | A1 | 10/2016 | Bastide et al. |
| 2016/0291811 | A1 | 10/2016 | Bastide et al. |
| 2016/0301646 | A1 | 10/2016 | Abou Mahmoud et al. |
| 2016/0301651 | A1 | 10/2016 | Abou Mahmoud et al. |
| 2017/0011102 | A1 | 1/2017 | Goel et al. |

OTHER PUBLICATIONS

Sanebox, "Email Overload in the Enterprise: The science behind email productivity," Sanebox.com, No Publication date, pp. 1-8.

Cano et al., "Capturing Entity-Based Semantics Emerging from Personal Awareness Streams," 1st Workshop on Making Sense of Microposts, downloaded from <http://ceur-ws.org/Vol-718/paper_08.pdf>, 2001, pp. 33-44.

International Business Machines Corporation. "Gaining full value from survey text," 2010, IBM Software Business Analytics, 12 pages.

International Business Machines Corporation. "SPSS Statistics" downloaded from <http://www-01.ibm.com/software/analytics/spss/products/statistics/> on Aug. 19, 2014, 2 pages.

International Business Machines Corporation, "SPSS text Analytics for Surveys" downloaded from <http://www-03.ibm.com/software/products/en/spss-text-analytics-surveys> on Aug. 19. 2014, 2 pages.

Wikipedia, "Natural Language Processing," downloaded from <http://en.wikipedia.org/wiki/Natural_language_processing> on Aug. 19. 2014, 11 pages.

International Business Machines Corporation, "List of IBM Patents of Patent Applications Treated as Related," Jan. 21, 2015, 2 pages.

International Business Machines Corporation, "List of IBM Patents or Patent Applications Treated As Related," submitted Mar. 14, 2016, 2 Pages.

International Business Machines Corporation, "List of IBM Patents or Patent Applications Treated As Related," submitted Dec. 21, 2016, 2 Pages.

Parr, Ben; "Breaking: Facebook Introduces @Mentions in Status Updates," Mashable M, 2009, pp. 1-9.

International Business Machines; "Analyzing survey text: a brief overview," IBM Software, Business Analytics, SPSS Text Analytics for Surveys, 2010, pp. 1-12.

Liangjie Hong, Ovidiu Dan, Brian D. Davison, "Predicting Popular Messages in Twitter", Department of Computer Science and Engineering, Lehigh University, WWW 2011, Mar. 28-Apr. 1, 2011, ACM, citeseerx.ist.psu.edu/viewdoc/download, pp. 1 and 2.

Twitter, Inc.; "What are @replies and mentions?" Twitter Help Center, downloaded from <http://support.twitter.com/articles/14023-what-are-replies-and-mentions> on Apr. 6, 2015, p. 1.

Wikipedia; "Mention (blogging)," downloaded from <http://en.wikipedia.org/wiki/Mention_%28blogging%29> on Apr. 6, 2015, pp. 1-3.

Using a Jive Community, No Publication Date, pp. 1-59.

* cited by examiner

GRAPH SEGMENT REPRESENTING A GIST OF AN ONLINE SOCIAL NETWORK CONVERSATION

BACKGROUND

Aspects of the present invention relate to social networks, message boards, online mail clients and the like, and more particularly to a method, system and computer program product for providing a graph segment representing a gist or summary of an online social network conversation.

Online social networks are a universal mechanism to connect people and information in logical and organized ways which enable sharing and processing of information between the members of the social network. Common mechanisms for sharing and processing information on online social networks may include, but are not necessarily limited to, a wall or virtual wall or message board where a user or member of the social network can post messages for other users or members; an activity stream which may be a list of messages or posts received by a user or member and may also include a list of messages or posts sent by the user or member; a timeline that may chronologically list a series of events, and profiles of users or members that can be accessed for information about a particular user or member. These mechanisms enable users or members to rapidly share information with others and gather information from others in the network. Often when engaged in online social media conversations, a conversation may span multiple views of the social network making it difficult for a user to understand the gist of main idea associated with the conversation. The user may mistakenly disregard the history of the conversation, especially if the conversation is lengthy and/or extends over a considerable span of time, for the last few messages posted to the conversation. This may provide the user with a false understanding of the gist or summary of the conversation. Accordingly, there is a need to provide an abbreviated or summarized view of the conversation.

SUMMARY

According to an embodiment of the present invention, a method for generating a graph segment providing a gist or summary of an online social network conversation may include generating a graph of the online social network conversation. The graph of the online social network conversation may include a plurality of nodes and each node may be connected to at least one other node by an edge. Each node may represent a message of the online social network conversation and each edge may correspond to an action by a participant in the online social network conversation. The method may also include determining an edge weight for each edge and analyzing the graph of the online social network conversation using at least the edge weight of at least some of the edges. The method may additionally include generating a graph, segment that provides a gist or summary of the online social network conversation based on the analysis.

According to another embodiment of the present invention, a system for generating a graph segment providing a gist or summary of an online social network conversation may include a processor and a module operating on the processor for generating a graph segment providing the gist or summary of the online social network conversation. The module may be configured to perform a set of functions that may include generating a graph of the online social network conversation. The graph of the online social network conversation may include a plurality of nodes and each node may connect to at least one other node by an edge. Each node may represent a message of the online social network conversation and each edge may correspond to an action by a participant in the online social network conversation. The set of functions may also include determining an edge weight for each edge and analyzing the graph of the online social network conversation using at least the edge weight of at least some of the edges. The set of functions may additionally include generating a graph segment that provides a gist or summary of the online social network conversation based on the analysis.

According to a further embodiment of the present invention, a computer program product for generating a graph segment providing a gist or summary of an online social network conversation may include a computer readable storage medium having program instructions embodied therewith. The computer readable storage medium is not a transitory medium per se and the program instructions are executable by a device to cause the device to perform a method including generating a graph of the online social network conversation. The graph of the online social network conversation may include a plurality of nodes and each node may be connected to at least one other node by an edge. Each node may represent a message of the online social network conversation and each edge may correspond to an action by a participant in the online social network conversation. The method may also include determining an edge weight for each edge and analyzing the graph of the online social network conversation using at least the edge weight of at least some of the edges. The method may further include generating a graph segment that provides a gist or summary of the online social network conversation based on the analysis.

In some embodiments of the present invention in combination with any of the above embodiment, determining the edge weight for each edge may include determining at least one of a set of factors that may include a sentiment of as post associated with the edge, a strength of a poster's online social network, a length of a message associated with the edge, a vitality of the online social network conversation and a weight of a subconversation of the online social network conversation.

In some other embodiments of the present invention and in combination with any of the above embodiments, analyzing the graph of the online social network may include at least one of performing a topological sort of the graph by ordering each edge of the graph based on the edge weight of each edge to provide an acyclic graph; determining a longest path or thread of the online social network conversation; and determining a densest path or thread of the online social network conversation. The densest path or thread may be the path or thread with a highest number of conversation activity or posts.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
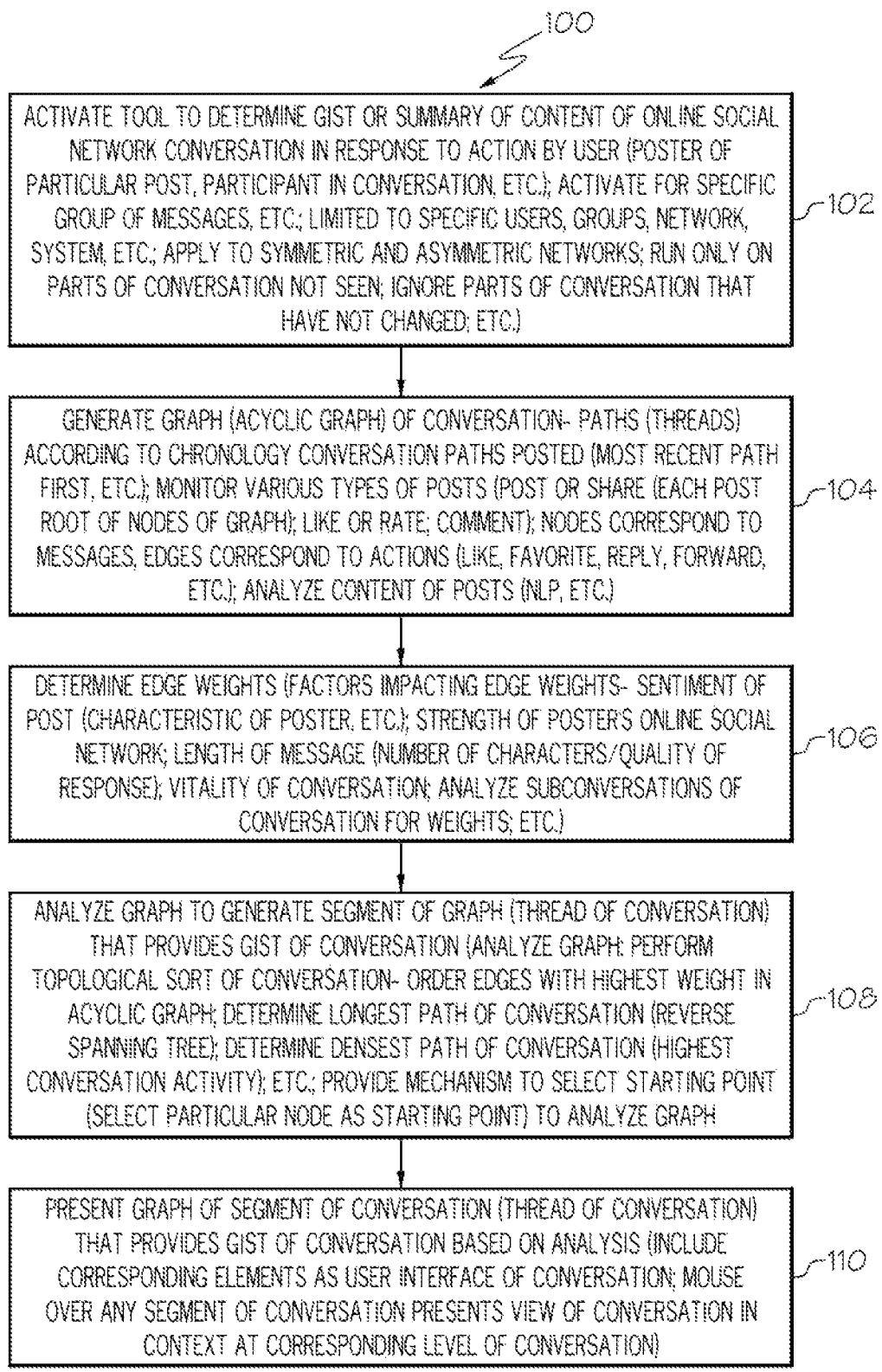
FIG. 1 is a flow chart of an example of a method for providing a graph segment representing a gist or summary of an online social network conversation in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating, electromagnetic waves, electromagnetic waves propagating through a waveguide or other transmission media light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function, in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 is a flow chart of an example of a method 100 for providing a graph segment representing a gist or summary of an online social network conversation in accordance with an embodiment of the present invention. In block 102, the method 100 or system to determine a gist or summary of content of an online social network conversation may be activated in response to an action by a user. The method 100 or system implementing the method 100 may be embodied in a conversation summarization tool. The method 100 or conversation summarization tool may be an application or module configured to operate on a computing device and determine the gist or summary of the content of an online social network conversation as described herein. The action by the user may include starting the tool or application by clicking on an icon using a computer pointing device or other action commonly used to open or start a program or application on a computing device. The user that activates the tool may be a poster or user that posts a particular post or message on the social network, a participant in the online social network conversation or other user of the social network.

The method 100 or conversation summarization tool may be activated for a specific group of messages or may be applied for summarization or obtaining the gist of a specific group of messages. The method 100 or tool may be limited for use by specific users or participants in a social network or to a specific group of users. The method 10 may also be limited for operation on particular network or system.

The method 100 or system implementing the method 100 may be applicable to any online social network including asymmetric or I follow social networks or media such as Twitter® and symmetric social networks or I connect social networks such a Facebook®, Connections or other social networks where members may be connected for communications in both directions. Twitter® is a trademark of Twitter, Inc. in the United States, other countries or both. Facebook® is a trademark of Facebook, Inc. in the United States, other countries or both. Connections is a trademark of International Business Machines Corporation in the United States, other countries or both.

The method 100 may also be run or performed only on certain parts or portions of a conversation, such as for example, parts of a conversation are not seen or not viewable by a user or participant for whatever reason. The method 100 may also be configured to ignore certain parts or portions of a conversation, such as for example, portions of a conversation which have not changed. As a further example, the method 100 may be selectively performed on an earliest portion of the online social network conversation, on a later or most recently posted portion of an online social network conversation, or may be performed on a chosen timeframe or range of the time within the entire duration of the online social network conversation. As described in more detail herein, a graph of the online social network conversation, similar to the exemplary graph 200 in FIG. 2, may be generated that may be a graphical user interface GUI). A user may use the GUI to select certain parts or portions of the conversation for analysis as described herein for determining a gist or summary of the conversation or that selected portion of the conversation.

Figure 2:
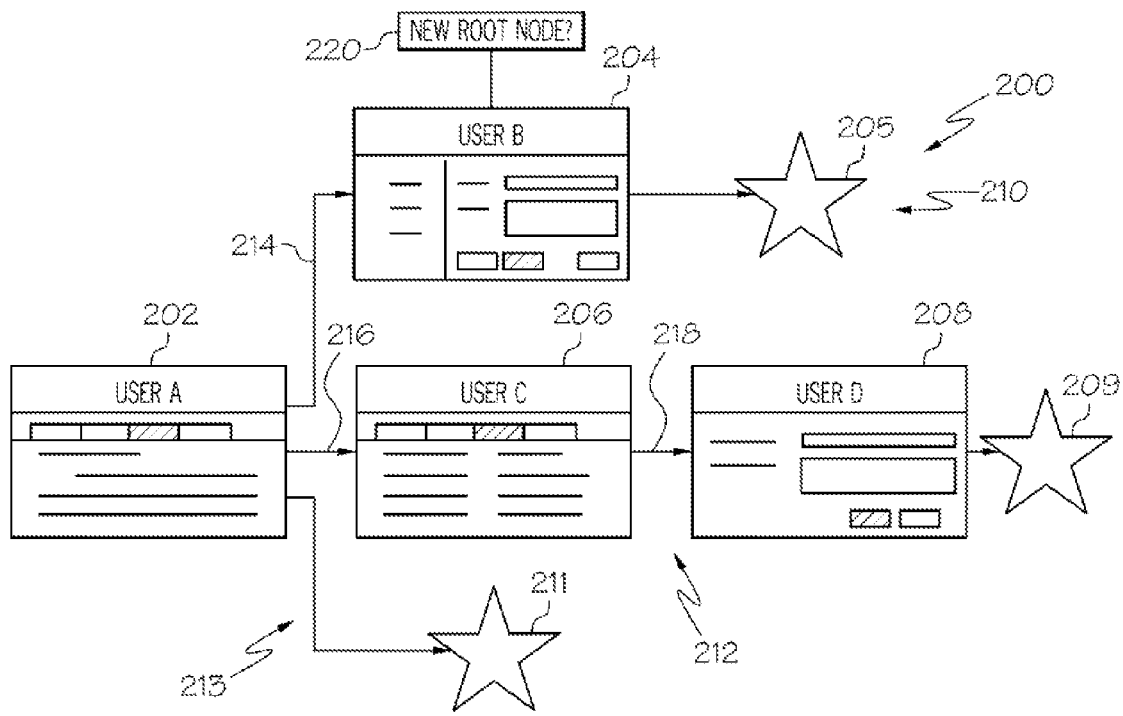
FIG. 2 is an example of a graph of an online social network conversation in accordance with an embodiment of the present invention.

In block 104, a graph of the online social network conversation may be generated. The graph may be in an acyclic graph of the conversation. Posts which may define a conversation thread may form a path of the graph. Generating the graph of the online social network conversation may include generating a path corresponding to each thread of the online social network conversation. Referring also to FIG. 2, FIG. 2 is an example of a graph 200 of an online social network conversation in accordance with an embodiment of the present invention. User A may post a message 202. User B may post a response 204 or reply to user A's message 202. Another user may post a "like" response, "favorite" response, agreement or express a sentiment to user B's response. A symbol, such as star 205 in FIG. 2, may be used to represent such a response to user B's post. User C may also post a response 206 or reply to user A's message 202. User D may post a response 208 or reply to user C's post and another user may post a "like," response, "favorite" response, or other action response that may express agreement or sentiment as represented by star 209. Another user may post an action response similar to those described above as represented by the star 211 to user A's message 202. Accordingly, response 205 to user B's response 204 to user A's message 202 may define one conversation thread or path 210 of the online social network conversation 200. Response 209 to user D's response 208 to user C's response 206 to user A's message 202 may define a second thread or path 212 of the online social network conversation 200. And response 211 may define a third thread or path 213 of the online social network conversation 200. The paths or threads may be formed or provided in the graph 200 chronologically with the most recent post being first or at the top of the graph 200. For example, user B's response 204 to user A's message 202 may be more recent than user D's response 208 to user C and user C's response 206 or reply to user A's message 202.

The actual posts, i.e., messages, responses or replies 202, 204, 206 and 208 may define nodes or vertices of the graph 200. Each node (202, 204, 206 or 208) may be connected to at least one other node (202, 204, 206 or 208) by an edge 214, 216 and 218. Each edge 214, 216 and 218 may correspond to an action by a user or participant in the online social network conversation 200. Examples of actions or edges may include but is not necessarily limited to a "like" response, a "favorite" response, a "reply" response, a "forward" response or other action by a participant or user. As previously described, the "like" response, "favorite" response, agreement, expressed sentiment or similar action responses may be designated by stars or other symbols in the graph of the online social network conversation, similar to stars 205, 209 and 211 in FIG. 2.

The paths or threads of the online social network conversation, such as conversation 200 in FIG. 2 may be determined by monitoring the various types of posts. The various types of post may include but are not necessarily limited to a post or share, like or rate, comment, or other post. Post or share may be defined as a user submitting a message to the social network to engage in a conversation. A like or rate post may be a post that rates a resource either within the social network or external to the social network. Accordingly, the rating may simply be that the user indicates a "like" rating or a "dislike" rating with respect to a certain resource either within the social network or external to the social network. A resource may be anything that may be used or accessed by the users or participants in the social network. For example, a resource may be a post or event on the social network which corresponds to a news article and a user may like or rate the corresponding resource.

A comment post may be a message posted in response to an existing post or message. Each post may be a root of the nodes in the graph 200 or may be considered a starting node or point for a conversation.

In block 106, edge weights may be determined for each edge, such as edges 214, 216 and 218 in FIG. 2, or at least some edges. A set of factors that may impact edge weights of the graph of the online social network conversation may include but is not necessarily limited to a sentiment of a post associated with the edge, a strength of a poster's online social network, a length of a message associated with the edge, a vitality of the online social network conversation, and analysis of weights of subconversations of the online social network conversation. Accordingly, one example of determining an edge weight for a particular edge associated with a particular message may include analyzing the particular message using natural language processing (NLP) or other processing to determine the sentiment of the particular message. The sentiment of the particular message and a profile of a user that posted the particular message may be used to determine the edge weight of the particular edge associated with the message. For example, by analyzing the post using NLP, a happy sentiment associated with the post may be determined. This information along with information in the poster's profile may be used to weight the edge associated with the post higher than if, for example, the sentiment of the post had been determined to be sad.

A strength of a user's or poster's online social network may be used to determine an edge weight of a particular edge associated with a particular message by determining a frequency of posts by a user that posted the particular message. The frequency of posts by the user provides an indication of a strength of the user. The edge weight may correspond to the strength of the user or frequency of posts by the particular user.

In another example or embodiment, the strength of a user's or poster's online social network may also be at least partially determined by an expertise of the user on a topic of the particular message. Accordingly, the edge weight may at least partially correspond to or be a function of a level of expertise of the user on the topic of the particular message. The topic of the particular message may be determined by NLP.

The strength of a user's online social network may be at least partially determined by a number of followers of the user and an expertise of the user on the topic of the particular message. The edge weight in this case may be determined as a function of the number of followers of the user and the level of expertise of the user on the topic of the particular message. For example, if a message creator or poster has 100 followers on the social network and is identified as having a certain level of expertise in the subject matter of a particular post, the edge weight of the edge associated with the post may be 100 times the certain level of the expertise of an average or ordinary user.

The edge weight may also be based on the length of the message associated with the edge. Determining an edge weight based on the length of the message associated with the edge may include determining a number of characters in the particular message. The edge weight may be higher for a message with a larger number of characters compared to another message. For example, an edge weight of an edge associated with a message containing 20 characters may be higher by a factor of 2 compared to an edge weight of an edge associated with a message containing 10 characters.

Determining an edge weight based on a vitality of the online social network conversation may include weighting edges associated with more recent messages higher than edges associated with older messages. For example, a conversation started nine months ago may have changed many times. Accordingly, more recent parts of the conversation may be more germane or relevant. Accordingly, edges associated with current posts or messages may have higher edge weights than older posts or messages.

Subconversations of an online social network conversation may also be analyzed to determine edge weights. The online social network conversation may evolve over the course of the conversation or time. Accordingly, a mechanism may be provided that permits a user to select a starting point on the graph of the online social network conversation for analyzing the graph to generate a graph segment that provides the gist or summary of the online social network conversation. In other words, a new root node for analysis of the graph of the online social network conversation may be selected by the user for determining the gist or summary of the conversation. An example of a mechanism to permit selection of a different starting point for analysis of the graph may include right clicking on a node, such as one of nodes 204, 206 or 208 in FIG. 2. A feature, such as the feature 220 in FIG. 2, may be presented in association with the node to select that node as the starting point or new root node for analysis of the graph of the online social network conversation. The feature 220 may include a box asking if the node is to be selected as the new root node. The feature 220 or box associated with node 204 in FIG. 2 may be selected or clicked-on using a computer pointing device for selecting node 204 as the new root node.

Returning to FIG. 1, in block 108, the graph of the online social network conversation may be analyzed to generate a graph segment that provides a gist or summary of the conversation. The graph may be analyzed using at least the edge weights or some of the edge weights. The graph segment may be a thread of the online social network conversation that provides the gist or summarization of the conversation. The graph of the online social network conversation may be analyzed by performing a topological sort of the graph of the conversation based on the edge weight of each of the edges or the edge weights of a least some of the edges. The topological sort may be performed by ordering the edges of the graph according to the highest weight in the acyclic graph. The edges may be arranged in a hierarchical order from the highest edge weighting to the lowest weighting.

The graph of the online social network conversation may also be analyzed to determine a longest path or thread of the online social network conversation. The longest path or thread may be determined using a reverse spanning tree algorithm. Each post or message in the online social network conversation may be labeled according to its depth in the conversation. This may be done via a breadth first traversal of the nodes or vertices in the graph. For example, a first node or message may be labeled as "1". A reply to the first node or message may be labeled "2". A reply-to-reply may be labeled "3" and a reply-to-reply-to-reply may be labeled "4", and so forth along a particular path or thread of the conversation for however many nodes may be in the path or thread. The longest path or thread will have the most number of nodes.

The graph of the online social network conversation may also be analyzed to determine a densest path or thread of the online social network conversation. The densest path or thread may be the path or thread with the highest conversation activity or number of posts. The densest path may also be determined using a technique similar that in performing the topological sort described previously.

As previously described, a mechanism may also be provided to select a particular node as a starting point for analyzing the graph. For example, right clicking on the particular node or other action may be performed to select the particular node as the starting point or root node. A feature, such as feature 220 in FIG. 2 may be presented for selecting or confirming selection of the node as the new root node.

Figure 3:
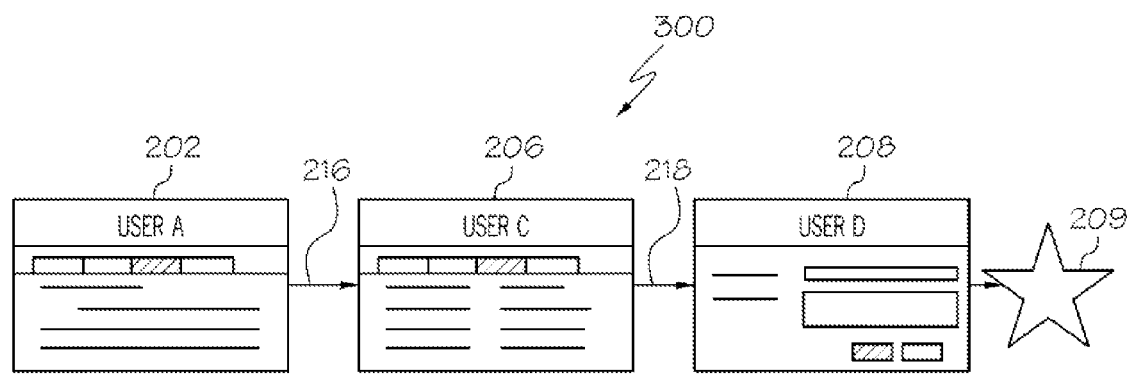
FIG. 3 is an example of a graph segment representing a gist or summary of the online social network conversation of FIG. 2 in accordance with an embodiment of the present invention.
Figure 4:
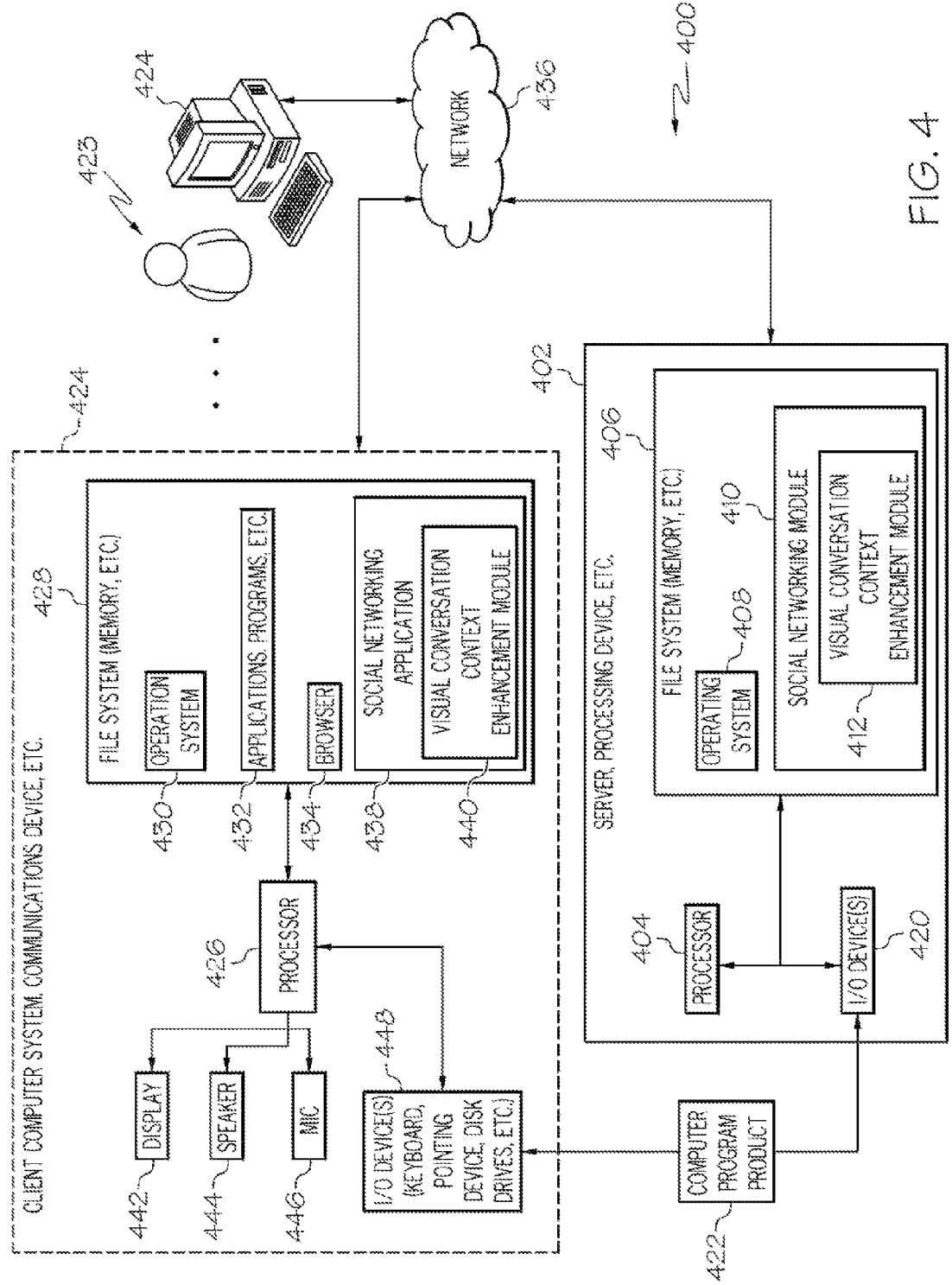
FIG. 4 is a block schematic diagram of an example of a system for providing a graph segment representing a gist or summary of an online social network conversation in accordance with an embodiment of the present invention.

In block 110, a graph of a segment of the conversation may be presented that provides the gist or summary of the conversation based on the analysis. The graph segment of the conversation that provides the gist or summary of the conversation may be a thread of the online social network conversation. Referring also to FIG. 3, FIG. 3 is an example of a graphical representation 300 of a gist or summary of the online social network conversation 200 of FIG. 2 in accordance with an embodiment of the present invention. The graphical representation 300 may be a segment of the graph 200 of the online social network conversation of FIG. 2 that provides the gist or summary of the conversation. The method 100 extracts the analyzed graph segment 300 representing the gist or summary of the conversation and may present the graph segment 300 as a user interface. The analysis of the graph may extract a longest path of the online social network conversation and present each node of the conversation. For any of the findings in the graph (sort, depth, activity, etc.), a one-for-one translation of the layout may be made to the display. A view of at least a portion of the online social network conversation may be presented at a selected location of the graph in response to positioning a computer pointing device, such as a mouse, over the selected location. Accordingly, a user may mouse over any segment of the conversation, to view the conversation in context at the corresponding level in the conversation. The analysis of the graph may extract a longest FIG. 4 is a block schematic diagram of an example of a system 400 for providing a graph segment representing a gist or summary of an online social network conversation in accordance with an embodiment of the present invention. The method 100 of FIG. 1 may be embodied in and performed by the system 400. The system 400 may include a processing device 402. The processing device 402 may be a server or similar processing device. The processing device 402 may include a processor 404 for controlling operation of the processing device 402 and for performing functions, such as those described herein with respect to providing a graph segment representing a gist or summary of an online network conversation. The processing device 402 may also include a file system 406 or memory. An operating system 408, applications and other programs may be stored on the file system 406 for running or operating on the processor 404. A social networking module 410 or system may also be stored on the file system 406 and may be compiled and run on the processor 404 to perform the functions for conducting online communications or conversations between users similar to that described herein. The social networking module 410 may be any type of online communications mechanism for online communications or conversations. The method 100 of FIG. 1 may be embodied in the social networking module 410 and performed by the processor 404 when the social networking module 410 is compiled and run on the processor 404.

The social networking module 410 may include a visual conversation context enhancement module 412 or system. The visual conversation context enhancement module 412 or system may also be referred to herein as a conversation summarization tool. The social networking module 410 may be configured to perform functions similar to those described with reference to the method 100 in FIG. 1.

The visual conversation context enhancement module 412, while shown in the exemplary embodiment of FIG. 4 as a component of the social networking module 410, the visual conversation context enhancement module 412 may be a separate component from the social networking module 410 in another embodiment.

The processing device 402 may also include one or more input devices, output devices or combination input/output devices, collectively I/O devices 420. The I/O devices 420 may include, but are not necessarily limited to, a keyboard or keypad, pointing device, such as a mouse, disk drive and any other devices to permit a user to interface with and control operation of the processing device 402 and to access the social networking module 410 or system. At least one of the I/O devices 420 may be a device to read a computer program product, such as computer program product 422. The computer program product 422 may be similar to that described in more detail herein. The social networking module 410 may be loaded on the file system 406 from a computer program product, such as computer program product 422.

A member of a social network or user 423 of the system 400 for social networking may use a computer system 424 or communications device to access the processing device 402 or server and social networking module 410 or system. The computer system 424 or communications device may be any sort of communications device including a mobile or handheld computer or communications device. The computer system 424 may include a processor 426 to control operation of the computer system 424 and a file system 428, memory or similar data storage device. An operating system 430, applications 432 and other programs may be stored on the file system 428 for running or operating on the processor 426. A web or Internet browser 434 may also be stored on the file system 428 for accessing the processing device 402 or server via to network 436. The network 436 may be the Internet, an intranet or other private or proprietary network.

In accordance with an embodiment, a social networking application 438, feature or module may also be stored on the file system 428 and operate on the processor 426 of the user's computer system 424. The social networking application 438 may be any sort of online communications mechanism, such as a social networking or social media application, electronic mail client or email application, or other application for online communications or conversations capable of performing the functions and operations described herein. The social networking application 43$ may include a visual conversation context enhancement module 440 or conversation summarization tool similar to that described herein. In another embodiment, the visual conversation context enhancement module 440 may be a separate module from the social networking application 438 and operate in cooperation with the social networking application 438 to perform the functions described herein. The method 100 of FIG. 1 or portions of the method 100 may be embodied in and performed by the visual conversation context enhancement module 440.

The social networking application 438 operating on the computer system 424 may interface with or operate in conjunction with the social networking module 410 or system on the processing device 402 or server to perform the functions and operations described herein for generating a graph segment providing a gist or summary of an online social network conversation. Accordingly, social networking application 438 operating on the computer system 424 may perform some of the functions and operations of the method 100 and social networking module 410 operating on the server 402 may perform other functions of the method 100. Some embodiments of the present invention may include only the social networking module 410 and visual conversation context enhancement module 412 on the processing device 402 or server, and other embodiments may include only the social networking application 438 and module 440 on the client computer system 424 or communications device.

The computer system 424 may also include a display 442, a speaker system 444, and a microphone 446 for voice communications. One or more user interfaces may be presented on the display 442 for controlling operating the social networking module 410 and social networking application 438 and for performing the operations and functions described herein.

The computer system 424 may also include one or more input devices, output devices or combination input/output, devices, collectively I/O devices 448. The I/O devices 448 may include a keyboard or keypad, pointing device, such as a mouse, disk drives and any other devices to permit a user, such as user 423, to interface with and control operation of the computer system 424 and to access the social networking application 438 and social networking module or system 410 on server 402. The I/O devices 448 may also include at least one device configured to read computer code from a computer program product, such as computer program product 422.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for generating a graph segment providing a gist or summary of an online social network conversation, the system comprising:
   a processor;
   a memory;
   a module stored in the memory and operable on the processor for generating a graph segment providing a gist or summary of an online social network conversation, the module being configured to cause the processor to perform a set of functions comprising:
   generating a graph of the online social network conversation, wherein the graph of the online social network conversation comprises a plurality of nodes and each node connecting at least one other node by an edge, each node representing a message of the online social network conversation and each edge corresponding to an action by a participant in the online social network conversation;
   determining an edge weight for each edge;
   analyzing the graph of the online social network conversation using at least the edge weight of at least some of the edges to generate a graph segment; and
   generating the graph segment, the graph segment comprising a reduced number of nodes of the graph of the online social network conversation based on analyzing the graph of the online social network conversation and the graph segment providing a gist or summary comprising an abbreviated view of the online social network conversation based on the analysis, each node of the reduced number of nodes corresponding to its own respective node of the graph of the online social network conversation.

2. The system of claim 1, wherein generating the graph of the online social network comprises monitoring a plurality of different types of posts to the online social network, the plurality of different types of posts comprising one of a message posted to the social network; a like or rate post to rate a resource within the social network or external to the social network; and a comment posted as a message responsive to an existing post.

3. The system of claim 1, wherein determining an edge weight for each edge comprises determining at least one of a set of factors comprising a sentiment of a post associated with the edge, a strength of a poster's online social network, a length of a message associated with the edge, a vitality of the online social network conversation and a weight of a subconversation of the online social network conversation.

4. The system of claim 1, wherein analyzing the graph of the online social network comprises at least one of:
   performing a topological sort of the graph by ordering each edge of the graph based on the edge weight of each edge to provide an acyclic graph;
   determining a longest path or thread of the online social network conversation; and
   determining a densest path or thread of the online social network conversation, the densest path or thread being the path or thread with a highest number of conversation activity or posts.

5. A computer program product for generating a graph segment providing a gist or summary of an online social network conversation, the computer program product comprising a computer readable storage medium having program instructions embodied therewith, wherein the computer readable storage medium is not a transitory medium per se, the program instructions being executable by a device to cause the device to perform a method comprising:
- generating a graph of the online social network conversation, wherein the graph of the online social network conversation comprises a plurality of nodes and each node connecting at least one other node by an edge, each node representing a message of the online social network conversation and each edge corresponding to an action by a participant in the online social network conversation; determining an edge weight for each edge;
- analyzing the graph of the online social network conversation using at least the edge weight of at least some edges to generate a graph segment; and
- generating the graph segment, the graph segment comprising a reduced number of nodes of the graph of the online social network conversation based on analyzing the graph of the online social network conversation and the graph segment providing a gist or summary comprising an abbreviated view of the online social network conversation based on the analysis, each node of the reduced number of nodes corresponding to its own respective node of the graph of the online social network conversation.

6. The computer program product of claim 5, wherein determining an edge weight for each edge comprises determining at least one of a set of factors comprising a sentiment of a post associated with the edge, a strength of a poster's online social network, a length of a message associated with the edge, a vitality of the online social network conversation and a weight of a subconversation of the online social network conversation.

7. The computer program product of claim 5, wherein analyzing the graph of the online social network comprises at least one of:
- performing a topological sort of the graph by ordering each edge of the graph based on the edge weight of each edge to provide an acyclic graph;
- determining a longest path or thread of the online social network conversation; and
- determining a densest path or thread of the online social network conversation, the densest path or thread being the path or thread with a highest number of conversation activity or posts.

8. The system of claim 1, wherein generating the graph of the online social network conversation comprises generating a path corresponding to each thread of the online social network conversation.

9. The system of claim 1, wherein determining the edge weight for a particular edge associated with a particular message comprises:
- analyzing the particular message using natural language processing to determine the sentiment of the particular message; and
- using the sentiment of the particular message and a profile of a user that posted the particular message to determine the edge weight of the particular edge associated with the particular message.

10. The system of claim 1, wherein determining the edge weight of a particular edge associated with a particular message comprises one of:
- determining a frequency of posts by a user that posted the particular message, the frequency of posts by the user providing an indication of a strength of the user, the edge weight corresponding to the strength of the user;
- determining an expertise of the user on a topic of the particular message, the edge weight corresponding to a level of expertise of the user on the topic of the particular message, wherein the topic of the particular message is determined by natural language processing; and
- determining a number of followers of the user and an expertise of the user on the topic of the particular message, the edge weight corresponding to a function of the number of followers of the user and the level of expertise of the user on the topic of the particular message.

11. The system of claim 1, wherein determining the edge weight of a particular edge associated with a particular message comprises determining a number of characters in the particular message, the edge weight being higher based on a larger number of characters being in the particular message.

12. The system of claim 1, wherein determining the edge weight for each edge comprises weighting edges associated with more recent messages higher than edges associated with older messages.

13. The system of claim 1, further comprising providing a mechanism for a user to select a particular node as a starting point on the graph of the online social network conversation for analyzing the graph to generate the graph segment providing the gist or summary of the online social network conversation.

14. The system of claim 1, further comprising presenting a view of at least a portion of the online social network conversation at a selected location of the graph in response to positioning a computer pointing device over the selected location.

* * * * *